United States Patent [19]

Rumpel

[11] 4,400,008
[45] Aug. 23, 1983

[54] INDEPENDENT REAR WHEEL SUSPENSION WITH A SPRING SEAT FIXED TO A CONTROL ARM

[75] Inventor: Manfred Rumpel, Birmingham, Mich.

[73] Assignee: Ford Motor Company, Dearborn, Mich.

[21] Appl. No.: 334,333

[22] Filed: Dec. 24, 1981

[51] Int. Cl.³ .............................................. B60G 7/00
[52] U.S. Cl. .................................. 280/666; 280/670; 280/672; 280/673; 280/701
[58] Field of Search ............... 280/660, 663, 666, 667, 280/670, 672, 673, 675, 702, 705, 711, 714, 724, 726; 267/66

[56] References Cited

U.S. PATENT DOCUMENTS 2,005,513  6/1935  Weaver ............................ 280/726
2,070,775  2/1937  Bell .................................. 280/666
2,171,157  8/1939  Mathews ......................... 280/660
2,305,820 12/1942  Wagner ........................... 280/666
2,842,230  7/1958  Macpherson .................... 280/666
3,024,040  3/1962  Müller ............................. 280/660

Primary Examiner—Robert R. Song
Attorney, Agent, or Firm—Roger L. May; Keith L. Zerschling

[57] ABSTRACT

An independent rear wheel suspension for a motor vehicle having front wheel drive includes a telescopic strut rigidly mounted to a wheel support member and having its upper end pivotably mounted to the vehicle chassis. Two laterally extending control arms are pivotably connected at their outboard ends to the wheel support member and at their inboard ends to the vehicle chassis. The two control arms are longitudinally spaced apart. One arm has an integrally formed spring seat which seats a coil spring interposed between the arm and the vehicle chassis. One of the arms is mounted through two longitudinally spaced resilient bushings which controls the amount of wheel recession. In addition, the suspension can be constructed to control the toe angle of the rear wheel during jounce or recession of the rear wheel.

11 Claims, 6 Drawing Figures

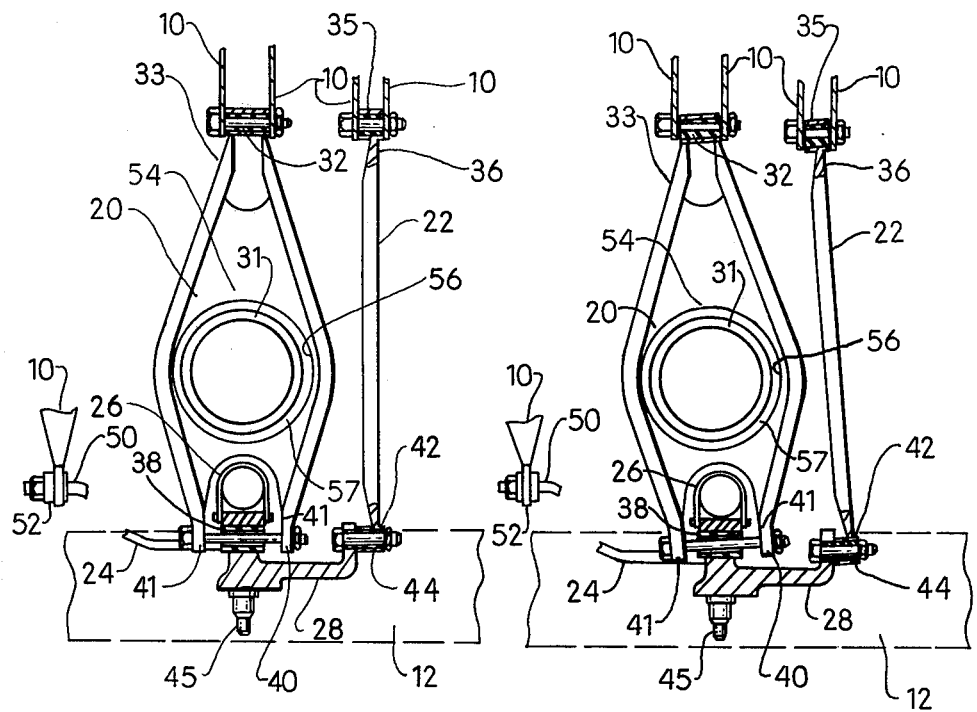
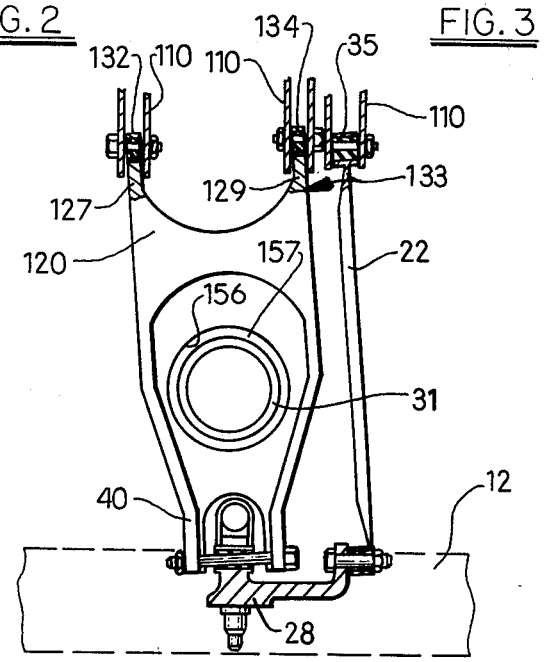
FIG. 2  FIG. 3
FIG. 6

INDEPENDENT REAR WHEEL SUSPENSION WITH A SPRING SEAT FIXED TO A CONTROL ARM

BACKGROUND OF THE INVENTION

1. Field of the Invention

This invention relates generally to independent wheel suspension systems for motor vehicles and more particularly to a strut type independent rear suspension for a front wheel drive vehicle.

2. Disclosure Information

Rear suspension systems have been constructed to control the attitude of the rear wheels in order to provide particular handling characteristics of the motor vehicle, for example roll understeer or roll oversteer, as well as to provide a soft ride free from road vibrations. Handling characteristics such as roll understeer, roll oversteer, or roll neutral steer during cornering of a motor vehicle are achieved by controlling the toe angle of one of the rear wheels during the jounce stroke of the suspension.

A vibration free ride is enhanced if the rear wheels are allowed to recess when the wheel hits a bump. However, both wheel recession and steering stability must be taken into account when designing a rear suspension. One way to take both factors into account is by controlling the toe angle of the wheel during its recession.

One way to control the toe angle of a wheel is with a suspension having two control arms substantially transverse to the longitudinal axis of the vehicle. The arms control the toe angle changes of the wheels as they shift positions.

However, previous usage of the two transverse control arms in combination with a strut suspension necessitated the spring element in the strut suspension to be mounted about the strut.

In many strut suspensions, the spring has been positioned away from the strut and interposed between a transverse control arm and the chassis so that the strut upper mount can be constructed from softer rubber, and secondly, valuable cargo space or engine compartment space can be maximized.

SUMMARY OF THE DISCLOSURE

In accordance with the present invention, an independent rear wheel suspension for a vehicle includes a chassis, a wheel support member, a telescopic shock absorbing strut rigidly secured at its lower end to the wheel support member and connected at its upper end to the chassis, and control arms pivotably connected to the chassis and the wheel support member. The control arms are longitudinally spaced from each other and substantially transverse to the longitudinal axis of the motor vehicle. A spring seat is integrally formed with the front control arm for seating a bottom end of a coil spring. The top end of the coil spring abuts the chassis of the motor vehicle.

It is desirable that the spring seat is recessed in the front control arm to form a pocket. The coil spring has its bottom end sized to fit in the pocket. Another aspect of the invention includes one of the transverse control arms being pivotably connected to the chassis by two longitudinally spaced resilient bushings.

The broader aspects of the present invention are directed to a chassis, a wheel support member, and front and rear control arms which extend substantially transverse to the longitudinal axis of the chassis. The control arms are pivotably connected at their inboard ends and their outboard ends to the chassis and wheel support member, respectively. A spring seat is rigidly connected to at least one of the arms and seats a spring means interposed between the spring seat and the chassis.

A suspension according to the present invention provides for increased cargo or engine space. Secondly, it allows the use of softer rubber in the strut upper mount. Furthermore, it provides the above features in a suspension that can provide roll understeer, roll oversteer, or roll neutral steer, as well as wheel recession. Another aspect of the present invention provides for eliminating the necessity of a longitudinally extending link member to control wheel recession.

BRIEF DESCRIPTION OF THE DRAWINGS

Reference is now made to the accompanying drawings in which:

FIG. 2 is a plan view of the left rear wheel suspension shown in FIG. 1;

FIG. 3 is a view similar to FIG. 2 showing the suspension during wheel recession;

FIG. 6 is a plan view similar to FIG. 5 showing the second embodiment during wheel recession.

DETAILED DESCRIPTION OF THE PREFERRED EMBODIMENTS

Figure 1:
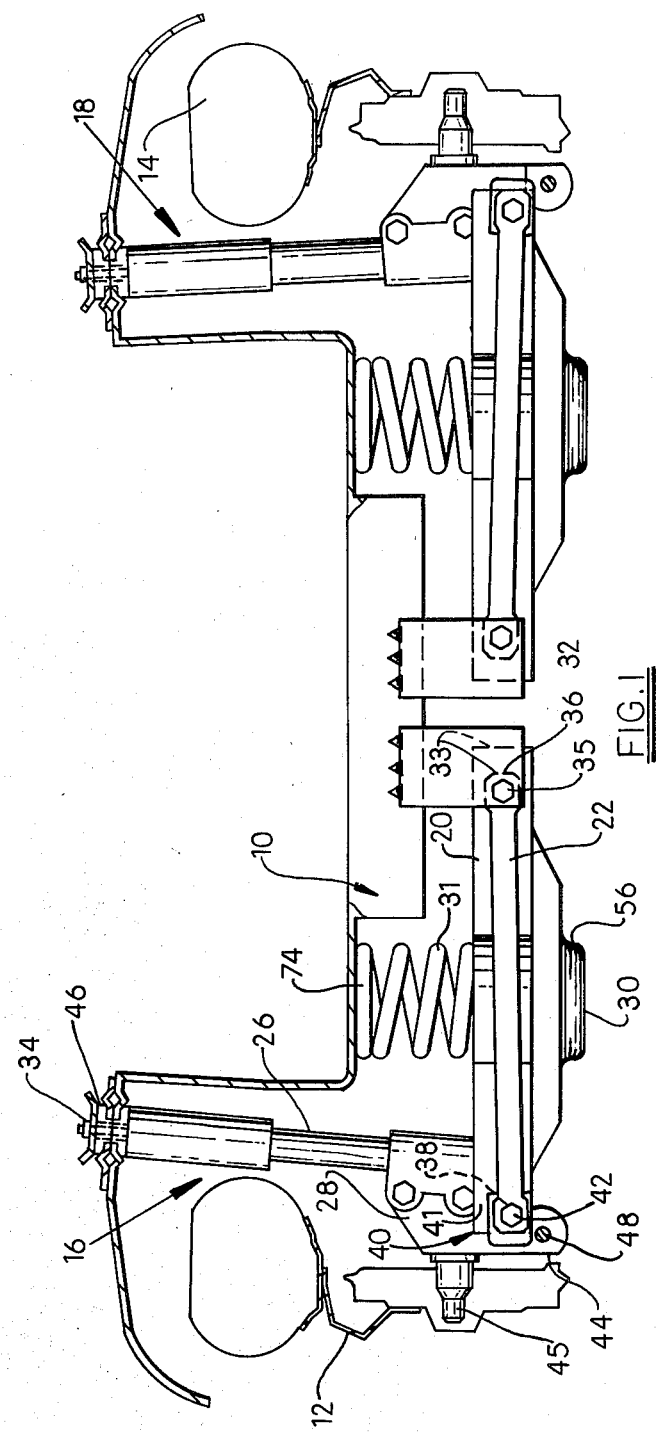
FIG. 1 is a rear elevational view, partly in section, of a motor vehicle incorporating independent rear wheel suspensions for its left and right rear wheels according to the invention.

Referring now to FIG. 1, a motor vehicle chassis (or unitized body and chassis) 10 is supported on left and right road wheels 12 and 14 by novel left and right independent wheel suspensions 16 and 18. Each wheel suspension 16 and 18 is identical except that one is a mirror image of the other; i.e., one is for the left side rather than for the right side. Since each independent suspension, is the same, reference will only be made to the left wheel suspension 16.

Generally, as shown in FIGS. 1 and 2, the wheel suspension 16 includes a front transverse control arm 20, a rear transverse control arm 22, trailing arm 24, and a telescopic strut 26 which connects a wheel support member 28 to the motor vehicle chassis 10. Means are provided to pivotably connect the inner ends of the arms 20, 22 to the chassis 10 and their outer ends to the wheel support member 28, as will be described. A spring seat 30 is integrally formed in arm 20 and seats a coil spring 31 interposed between the seat 30 and chassis 10.

The front arm 20 has an elastomeric bushing 32 at its inboard end 33 which pivotably connects the arm 20 to the chassis 10. Similarly, the rear arm 22 has a similar bushing 35 at its inboard end 36 which pivotably connects the arm 22 to the chassis 10. An elastomeric bushing 38 pivotably connects the two prongs 41 of the outboard end 40 of the front control arm 20 to the wheel support member 28. Similarly, a resilient bushing 42 pivotably connects outboard end 44 of the rear control arm 22 to the wheel support member 28.

The wheel support member 28 has an integral wheel spindle 45 which rotatably mounts wheel 12. The spindle 45 is positioned longitudinally between the two prongs 41 of the outboard end 40 of arm 20 and is longitudinally aligned with bushing 38. The wheel support member 28 is rigidly connected to the telescopic shock absorbing strut 26. The upper end 34 of the strut 26 is pivotably connected through a resilient upper mount 46 to the chassis 10.

The longitudinal trailing arm 24 is connected through an elastomeric bushing 48 to the wheel support member 28 and extends substantially forward therefrom. The arm 24 has its front end 50 resiliently connected through bushing 52 to the chassis 10.

The spring seat 30 is integrally formed with the front control arm 20 at a mid-position between the inboard end 33 and outboard end 40 of the arm 20. The spring seat 30 is recessed downward from the central area 54 and connected thereto by a downwardly extending wall section 56. In general, the recessed seat 30 forms a pocket 57 which receives the lower end of coil spring 31 as it is seated against seat 30.

The top end 74 of coil spring 31 is seated against the chassis 10 so that the coil spring 31 normally exerts a downwardly biasing force on the spring seat 30 and control arm 20 when the vehicle is at rest.

When the control arms 20 and 22 undergo jounce movement, the arms 20 and 22 pivot upwardly about the inboard bushings 32 and 35. As the arms 20 and 22 pivot upwardly, the spring seat 30 is moved upward with the arm 20 to compress coil spring 31.

Similarly, when the control arms 20 and 22 undergo rebound movement and pivot downwardly about inboard bushings 32 and 35, the spring seat 30 moves downwardly and allows coil spring 31 to elongate.

Arms 20 and 22 and the other suspension components may be arranged to provide an increase in toe-in during jounce of wheel 12. Alternatively, no toe change or toe out may be provided during jounce of wheel 12. One skilled in the art can provide the appropriate geometry of the various suspension arms that will provide the desired toe angle changes during jounce.

The plurality of resilient bushings in the suspension system allow the road wheel to recess when subjected to a longitudinal force such as occurs when the wheel strikes a road obstacle (e.g., a tar strip in concrete pavement). As shown in FIG. 3, the control arms 20 and 22 control the toe angle of the rear wheel 12 during recession of the wheel. Arms 20 and 22 and the other suspension components may be arranged to provide no toe change during recesson of the wheel. Alternatively, the arms 20 and 22 may be arranged to provide toe-in as the wheel undergoes recession.

The trailing arm 24 controls the amount of recession due to its resilient bushings 48 and 52. The amount of recession desired may be determined by the appropriate choice of elastomeric material for use in bushings 48 and 52 and the size of bushings 48 and 52. Softer elastomers provide for more recession than harder elastomers. Likewise larger bushings provide for more recession than smaller bushings.

As also shown in the figures, the position of the spring near the control arms rather than about strut 26 provides for increased cargo or engine space since the clearance about strut 26 can be minimized. Furthermore, because the spring loads arms 20 and 22 and not mount 46, softer rubber can be used in upper mount 46 than would otherwise be feasible.

Figure 5:
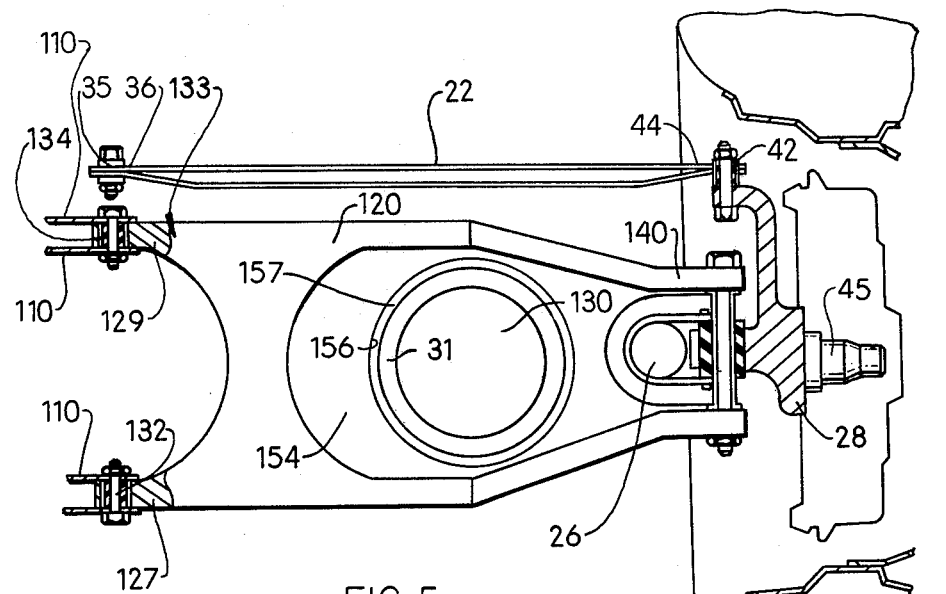
FIG. 5 is an enlarged plan view similar to FIG. 2 showing the second embodiment.
Figure 4:
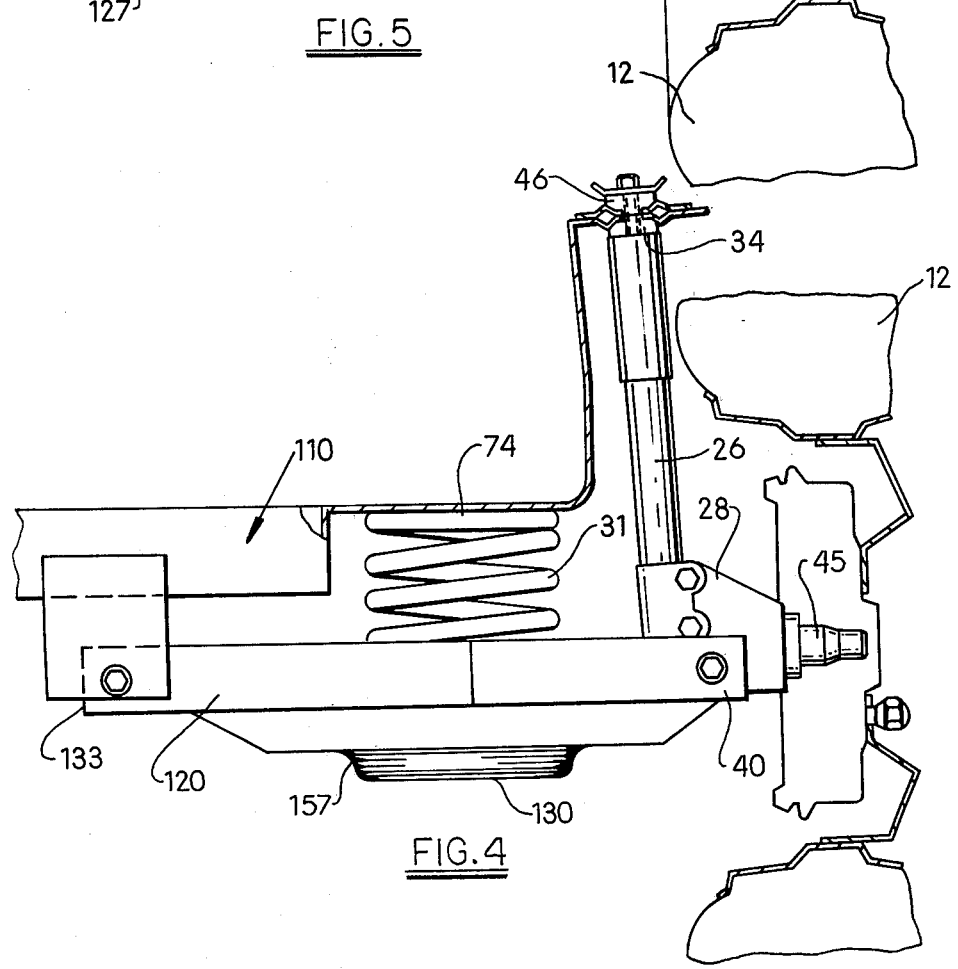
FIG. 4 is an enlarged front elevational and partially fragmented view of a second embodiment of a left rear wheel suspension.

Reference now will be made to FIGS. 4–6 which disclose a second embodiment. To simplify the discussion, parts that are identical to parts described in the first embodiment are referred to with the same numeral.

In the second embodiment, the front arm 120 has its inner end 133 bifurcated into two stems 127 and 129 to receive two spaced apart bushings 132 and 134 which pivotably connect the arm 120 to chassis 110 about a horizontal axis. Each bushing 132 and 134 is resilient to allow the arm 120 limited pivotable motion about a vertical axis as well. However, the resilient spaced apart bushings 132 and 134 limit the amount of pivotable motion of the arm 120 and, hence, limit the recession of wheel 12 without the use of a tie rod (or trailing arm). The front arm 120 is connected to the wheel support member 28 at its outboard end 140 in the same fashion as the first embodiment. The rear arm 22 is also connected to the chassis 110 and wheel support member 28 in the same fashion as the first embodiment. The coil spring 31 is likewise received in the spring pocket 157 in the center area 154 of arm 120 and has its lower end seated against recessed spring seat 130.

As in the first embodiment, one skilled in the art can provide the appropriate geometry of the various suspension arms that will provide an increase in toe-in during jounce. In addition, as shown in FIG. 6, the appropriate geometry of the arms can be provided to provide the desired amount of toe angle change during recession of the wheel 12.

The arm 120 controls the amount of recession due to its resilient bushings 132 and 134. The amount of recession desired may be determined by choosing the appropriate size of the bushings 132 and 134 and the appropriate elastomeric material for use in the bushings 132 and 134. Softer elastomers provide for more recession than harder elastomers. Similarly, larger bushings provide for more recession than smaller bushings. In addition, the amount of recession is determined by the spacing of the bushings 132 and 134. The closer the bushings are together, the more recession is allowed.

The amount of recession allowed per amount of recessive directed force can be easily adjusted by removing bushings 132 and 134 and replacing them with a pair of bushings that allow greater or less amount of lateral displacement per amount of laterally directed force.

In addition to toe angle change being controlled during recession by the geometry of the suspension, toe angle change can be affected by the appropriate choice of bushings 132 and 134. Bushing 132 can be chosen to be identical or different from bushings 134 such that the ratio of the amount of lateral displacement per amount of laterally directed force exerted on bushing 132 can be higher, lower or the same as the ratio for bushing 134. The choice can be determined by the desire to have toe out, no toe angle change, or toe in during wheel recession.

For example, if the bushings 132 and 134 are identical, stems 127 and 129 undergo lateral displacement in equal amounts and in opposite directions. Consequently, the effective pivot point of arm with respect to chassis 110 during recession is midway between the two bushings 132 and 134. On the other hand, for example, if bushing 132 is chosen to be stiffer (i.e., have a lower above-identified ratio) than bushing 134, the effective pivot point of arm 120 with respect to chassis 110 during recession is located more closely to bushing 132. Conversely, if bushing 132 is chosen to be softer (i.e., have a higher above-identified ratio) than bushing 134, the effective pivot point of arm 120 with respect to chassis 110 during recession is located more closely to bushing 134.

The movement of the effective pivot point between arm 120 and chassis 110 affects the toe angle change of the suspension during recession. The more forward the effective pivot point is located, the tendency of the suspension to produce toe-in during recession is enhanced.

In this fashion, the suspension as described provides for increased cargo or engine space, allows softer rubber to be used in the strut upper mount, and can be constructed to provide roll understeer, roll oversteer, or roll neutral steer, as well as wheel recession. In addition, wheel recession can be controlled in an efficient manner with a minimum number of parts.

Variations and modifications of the present invention are possible without departing from its spirit and scope as defined by the appended claims.

The embodiments in which an exclusive property or privilege is claimed are defined as follows:

1. An independent rear wheel suspension for a vehicle comprising:
    a chassis;
    a wheel support member adapted to rotatably mount a wheel;
    an upwardly extending telescopic shock absorber having its lower end rigidly secured to said wheel support member;
    means pivotably connecting the upper end of said shock absorber to said chassis;
    transversely extending front and rear control arms pivotably connected at their inboards ends to said chassis and at their outboard ends to said wheel support member;
    a spring seat means integrally formed with one of said arms and seating a spring means interposed between said spring seat means and said chassis.

2. An independent rear wheel suspension as defined in claim 1 further comprising:
    a longitudinal link having one end connected to said chassis and its other end connected to said wheel support member.

3. An independent rear wheel suspension for a vehicle comprising:
    a chassis;
    a wheel support member;
    an upwardly extending telescopic shock absorber having its lower end rigidly secured to said wheel support member;
    means pivotably connecting the upper end of said shock absorber to said chassis;
    transversely extending front and rear control arms pivotably connected at their inboard ends to said chassis and at their outboard ends to said wheel support member;
    a spring seat integrally formed with said front control arm;
    said spring seat seating a spring interposed between said spring seat and said chassis.

4. An independent rear suspension as defined in claim 3 wherein:
    said spring seat is recessed downwardly within said front arm to form a pocket;
    said spring means comprises a coil spring sized to fit within said pocket.

5. An independent rear wheel suspension as defined in claim 4 further comprising:
    a longitudinal link having one end connected to said chassis and its other end connected to said wheel support member.

6. An independent rear wheel suspension for a vehicle comprising:
    a chassis;
    a wheel support member;
    transversely extending front and rear control arms pivotably connected at their inboard ends to said chassis and at their outboard ends to said wheel support member;
    a spring seat integrally formed with one of said front and rear control arms;
    said spring seat seating a spring interposed between said spring seat and said chassis.

7. An independent rear wheel suspension as defined in claim 6 wherein:
    said spring seat is integral with said front control arm and recessed downwardly within said front control arm to form a pocket;
    said spring comprises a coil spring having its lower end sized to fit within said pocket.

8. An independent rear wheel suspension as defined in claim 7 further comprising:
    a longitudinal link having one end connected to said chassis and its other end connected to said wheel support member.

9. An independent rear wheel suspension for a vehicle comprising:
    a chassis;
    a wheel support member;
    an upwardly extending telescopic shock absorber having its lower end rigidly secured to said wheel support member;
    means pivotably connecting the upper end of said shock absorber to said chassis;
    transversely extending frnt and rear control arms pivotably connected at their inboard ends to said chassis and at their outboard ends to said wheel support member;
    a spring seat rigidly connected to one of said front and rear control arms;
    said spring seat seating a spring interposed between said spring seat and said chassis.

10. An independent rear wheel suspension for a vehicle comprising:
    a chassis;
    a wheel support member adapated to rotatably mount a wheel;
    an upwardly extending telescopic shock absorber having its lower end rigidly secured to said wheel support member;
    means pivotably connecting the upper end of said shock absorber to said chassis;
    a first transversely extending control arm pivotably connected at its inboard end to said chassis and at its outboard end to said wheel support member;
    a second transversely extending control arm positioned in front of said first control arm and having its outboard end pivotably connected to said wheel support member;
    said second transversely extending control arm having its inboard end connected by two longitudinally spaced resilient bushings to said chassis;
    a spring seat rigidly connected to said second control arm;
    said spring seat seating a spring interposed between said spring seat and said chassis.

11. A method for changing the wheel recession rate of an independent rear wheel suspension comprising:
  a chassis;
  a wheel support member;
  transversely extending front and rear control arms pivotably connected at their inboard ends to said chassis and at their outboard end to said wheel support member;
  one of said transversely extending arms being resiliently connected to said chassis by two longitudinally spaced resilient bushings;
  said two longitudinally spaced bushings being constructed to allow said one arm to pivot about a vertical axis as said wheel support member recesses to control the amount of said wheel recession per amount of recessive force acting on said wheel at an initial rate;
  said method comprising the steps of:
  removing said two longitudinally spaced resilient bushings;
  replacing said removed bushings with another pair of resilient bushings that have different resilient characteristics then said removed bushings such that the amount of wheel recession per amount of recessive force on said wheel is varied from said initial rate.

* * * * *